US012774007B2

(12) United States Patent
Doi

(10) Patent No.: US 12,774,007 B2

(45) Date of Patent: Oct. 27, 2026

(54) DRIVE ASSIST DEVICE

(71) Applicant: TOYOTA JIDOSHA KABUSHIKI KAISHA, Toyota (JP)

(72) Inventor: Tomoyuki Doi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 19/195,831

(22) Filed: May 1, 2025

(65) Prior Publication Data

US 2026/0062026 A1 Mar. 5, 2026

(30) Foreign Application Priority Data

Aug. 27, 2024 (JP) ................................ 2024-145170

(51) Int. Cl.

| | |
|---|---|
| ***B60W 50/14*** | (2020.01) |
| ***B60W 10/188*** | (2012.01) |
| ***B60W 30/18*** | (2012.01) |
| ***B60W 50/00*** | (2006.01) |

(52) U.S. Cl.

CPC .......... *B60W 50/14* (2013.01); *B60W 10/188* (2013.01); *B60W 30/18127* (2013.01); *B60W 50/0098* (2013.01); *B60W 2520/10* (2013.01); *B60W 2540/106* (2013.01); *B60W 2540/12* (2013.01); *B60W 2552/15* (2020.02)

(58) Field of Classification Search

CPC ............... B60W 50/14; B60W 10/188; B60W 30/18127; B60W 50/0098; B60W 2520/10; B60W 2540/106; B60W 2540/12; B60W 2552/15; B60W 2720/106; B60W 30/181; B60W 10/04; B60W 10/18; B60W 2050/146

USPC ........................................................ 340/425.5

See application file for complete search history.

(56) References Cited

U.S. PATENT DOCUMENTS

| | | | |
|---|---|---|---|
| 9,964,950 | B2 | 5/2018 | Takano |
| 10,017,116 | B2 | 7/2018 | Sato |
| 10,310,508 | B2 | 6/2019 | Kunisa et al. |
| 10,452,930 | B2 | 10/2019 | Sato |
| 10,663,973 | B2 | 5/2020 | Hashimoto et al. |
| 10,895,875 | B2 | 1/2021 | Hashimoto et al. |
| 11,001,198 | B2 | 5/2021 | Morimura et al. |
| 11,275,382 | B2 | 3/2022 | Hashimoto et al. |

(Continued)

FOREIGN PATENT DOCUMENTS

| | | |
|---|---|---|
| JP | 2024-023731 A | 2/2024 |

*Primary Examiner* — Eric Blount

(74) *Attorney, Agent, or Firm* — SoraIP, Inc.

(57) ABSTRACT

The drive assist device performs a deceleration notification for notifying the driver that the vehicle is decelerated when the vehicle is automatically decelerated. The drive assist device determines whether or not the suppression condition is satisfied based on the deceleration index value indicating the degree of deceleration of the vehicle and the traveling state of the vehicle, and the satisfied suppression condition indicates that there is a higher possibility that the driver does not notice the deceleration of the vehicle than in the case where the suppression condition is not satisfied, and when the suppression condition is satisfied, the drive assist device suppresses the deceleration notification as compared with the case where the suppression condition is not satisfied.

4 Claims, 4 Drawing Sheets

(56) References Cited

U.S. PATENT DOCUMENTS

| | | | | |
|---|---|---|---|---|
| 2014/0074369 | A1* | 3/2014 | Kim | B60L 7/26<br>701/70 |
| 2018/0312172 | A1* | 11/2018 | Nohl | B60W 50/14 |
| 2020/0062228 | A1* | 2/2020 | Nakabayashi | B60Q 9/008 |
| 2021/0122372 | A1* | 4/2021 | Park | B60T 8/1769 |
| 2021/0229598 | A1 | 7/2021 | Morimura et al. | |
| 2021/0261149 | A1 | 8/2021 | Doi | |
| 2021/0380124 | A1 | 12/2021 | Urano et al. | |
| 2022/0105925 | A1* | 4/2022 | Naserian | B60W 10/184 |
| 2024/0109550 | A1* | 4/2024 | Fujimoto | B60W 50/14 |
| 2026/0021823 | A1* | 1/2026 | Yasui | B60W 50/14 |

* cited by examiner

DRIVE ASSIST DEVICE

CROSS-REFERENCE TO RELATED APPLICATION

This application claims priority to Japanese Patent Application No. 2024-145170 filed on Aug. 27, 2024. The disclosure of the above-identified application, including the specification, drawings, and claims, is incorporated by reference herein in its entirety.

BACKGROUND

1. Technical Field

The present disclosure relates to a drive assist device configured to perform deceleration notification for notifying a driver that a vehicle is decelerated when the vehicle is automatically decelerated.

2. Description of Related Art

Hitherto, a drive assist device that performs deceleration notification has been known. For example, a drive assist device described in Japanese Unexamined Patent Application Publication No. 2024-023731 (JP 2024-023731 A) (hereinafter referred to as "related-art device") automatically decelerates a vehicle when a deceleration target that causes the need to decelerate the vehicle is detected, and displays a deceleration screen for notifying a driver of the deceleration target, thereby performing deceleration notification.

SUMMARY

If the deceleration notification is performed while the driver is not aware of the deceleration of the vehicle, the driver may feel uncomfortable.

The present disclosure provides a drive assist device that can reduce a possibility that a driver who is not aware of deceleration of a vehicle feels uncomfortable in deceleration notification.

A drive assist device of the present disclosure (hereinafter referred to as "present disclosure device") is configured to perform deceleration notification for notifying a driver that a vehicle is decelerated when the vehicle is automatically decelerated.

The drive assist device is configured to:

- determine whether a suppression condition is satisfied based on a deceleration index value indicating a degree of deceleration of the vehicle and a traveling state of the vehicle, satisfaction of the suppression condition indicating a higher possibility that the driver is not aware of the deceleration of the vehicle than in a case where the suppression condition is not satisfied; and
- when the suppression condition is satisfied, suppress the deceleration notification as compared with the case where the suppression condition is not satisfied.

The satisfaction of the suppression condition indicates a higher possibility that the driver is not aware of the deceleration of the vehicle than in the case where the suppression condition is not satisfied. Therefore, when the suppression condition is satisfied, the present disclosure device suppresses the deceleration notification as compared with the case where the suppression condition is not satisfied. Thus, it is possible to reduce the possibility that the driver who is not aware of the deceleration of the vehicle feels uncomfortable in the deceleration notification.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
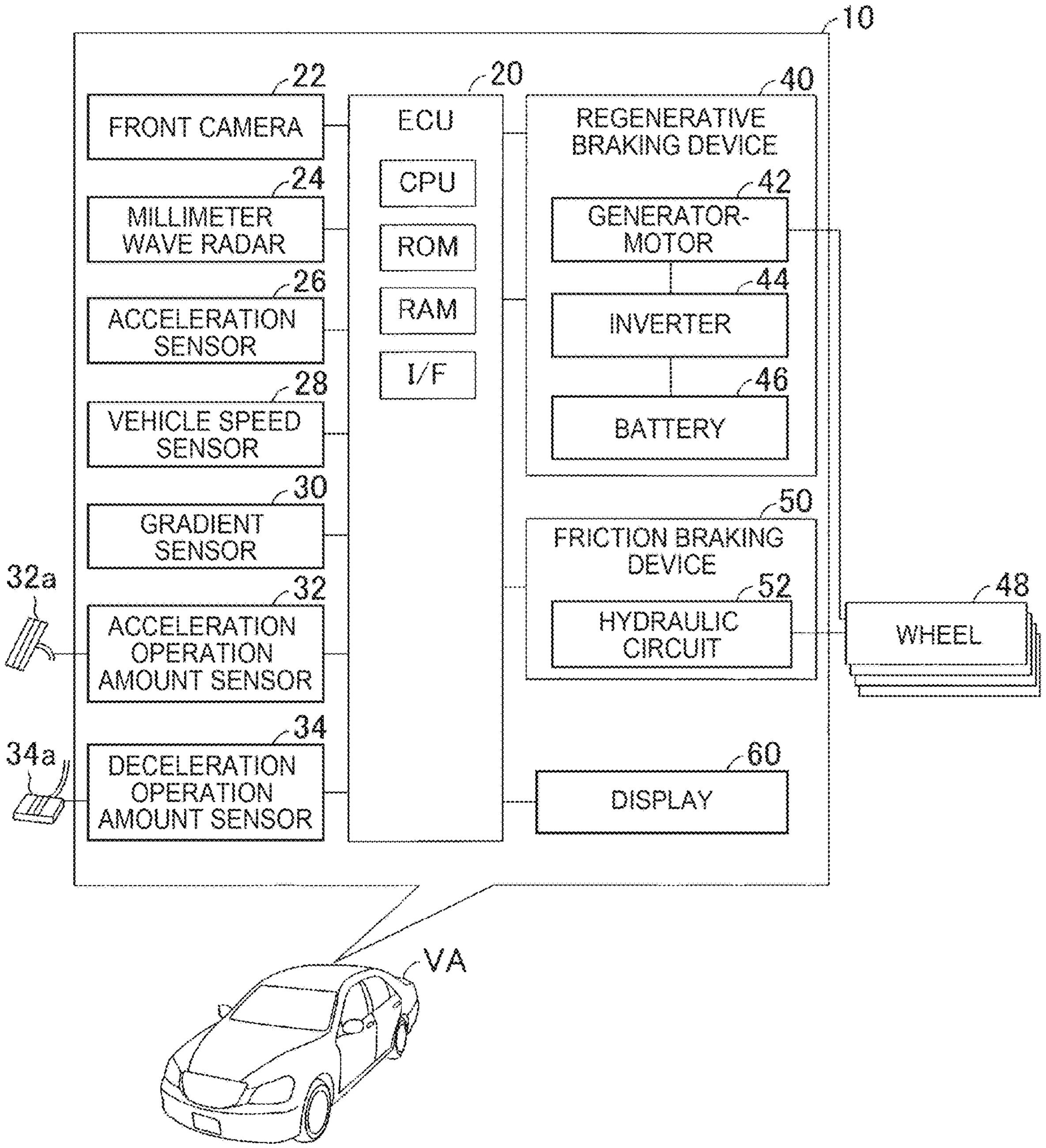
FIG. 1 is a schematic system configuration diagram of a drive assist device according to an embodiment of the present disclosure.

The drive assist device 10 (hereinafter, the device 10) according to the embodiment of the present disclosure is applied to a vehicle VA and includes the components illustrated in FIG. 1. In the present specification, "ECU 20" is an electronic control device including a microcomputer as a main part. ECU 20 are also referred to as control units, controllers and computers. The microcomputer includes a CPU (processor), a ROM, RAM, and interfaces (I/F). The function realized by ECU 20 may be realized by a plurality of ECU.

The front camera 22 captures an image of a scene in front of the vehicle VA. The millimeter wave radar 24 receives the reflected wave reflected by the object by the millimeter wave transmitted to the front of the vehicle VA, and acquires radar data related to the object. The radar data includes the position of the object with respect to the vehicle VA and the velocity of the object with respect to the vehicle VA. ECU 20 acquires image data from the front camera 22 and acquires radar data from the millimeter-wave radar 24. ECU 20 recognizes objects in front of the vehicle VA based on the imaging data and the radar data.

The acceleration sensor 26 measures an acceleration Gx of the vehicle VA in the front-rear direction and an acceleration Gy of the vehicle VA in the vertical direction. When the vehicle VA accelerates forward, the acceleration Gx becomes a positive value, and when the vehicle VA accelerates backward (that is, when the vehicle VA decelerates), the acceleration Gx becomes a negative value. Deceleration is a negative acceleration Gx. The vehicle speed sensor 28 measures a vehicle speed Vs representing the speed of the vehicle VA. The gradient sensor 30 measures a gradient θ of a road surface on which the vehicle VA travels. If the road surface is an upward gradient, the gradient θ is a positive value, and if the road surface is a downward gradient, the gradient θ is a negative value. The acceleration operation amount sensor 32 measures an acceleration operation amount ΔP representing an operation amount of the accelerator pedal 32*a*. The accelerator pedal 32*a* may also be referred to as an "acceleration operator". The deceleration operation amount sensor 34 measures a deceleration operation amount BP representing an operation amount of the brake pedal 34*a*. ECU 20 obtains the readings of these sensors 26-34. The brake-pedal 34*a* may also be referred to as a "deceleration operator".

The regenerative braking device 40 includes a generator motor 42, an inverter 44, and a battery 46. The generator motor 42 is, for example, an AC synchronous motor. The output shaft of the generator motor 42 is connected to the drive wheels so that the power generated in the output shaft is transmitted to the drive wheels (48). The battery 46 is a power storage device that can be charged and discharged. When the accelerator pedal 32*a* is depressed, the regenerative braking device 40 functions as a "driving device for driving the driving wheels".

The inverter 44 is electrically connected to the battery 46. When the generator motor 42 operates as a generator (when the regenerative braking device 40 functions as a braking device), the generator motor 42 converts the rotational (kinetic) energy of the drive wheels into electrical energy (AC power). The inverter 44 converts AC power supplied from the generator motor 42 into DC power, and supplies the DC power to the battery 46. In this way, the battery 46 is charged. When the generator motor 42 operates as a generator, regenerative braking force is generated in the drive wheels. On the other hand, when the generator motor 42 operates as an electric motor (when the regenerative braking device 40 functions as a driving device), the inverter 44 converts DC power supplied from the battery 46 into AC power and supplies the AC power to the generator motor 21. As a result, the generator motor 21 is driven and a driving force is applied to the driving wheels.

As described above, the generator motor 21 is a braking actuator that applies a regenerative braking force to the drive wheels, and is a driving actuator that applies a driving force to the drive wheels.

The friction braking device 50 includes a hydraulic circuit 52 that functions as a braking actuator. The hydraulic circuit 31 operates the wheel cylinders by supplying hydraulic pressure to wheel cylinders (not shown) disposed corresponding to the respective wheels. When the wheel cylinder is operated, a brake pad (not shown) is pressed against the brake disc of each wheel 48, so that a friction braking force is generated in each wheel 48.

The display 60 is disposed in a vehicle cabin of the vehicle VA. A deceleration screen to be described later is displayed on the display 60.

Overview of Operation

ECU 20 of the device 10 determines whether or not the vehicle VA needs to be decelerated based on the relation between the vehicle VA and, for example, a preceding vehicle (deceleration target object). ECU 20 automatically decelerates the vehicle VA when the vehicle VA needs to be decelerated. ECU 20 determines whether or not the control condition is satisfied when VA is automatically decelerated. The establishment of the suppression condition indicates that the driver is more likely not to notice the deceleration of the vehicle VA than when the suppression condition is not satisfied.

When the suppression condition is not satisfied, ECU 20 displays a deceleration screen on the display 60, thereby issuing a deceleration notification. The deceleration screen is a screen for notifying the driver of the fact that the vehicle VA has decelerated and the reason (deceleration target) that the vehicle VA has decelerated. On the other hand, when the reduction condition is not satisfied, ECU 20 performs the reduction notification by suppressing the reduction notification. For example, ECU 20 suppresses the deceleration notification by not displaying the deceleration window.

Accordingly, when the driver is likely not to notice the deceleration of the vehicle VA, the deceleration notification is suppressed. Therefore, according to the device 10, it is possible to reduce the possibility that the driver who does not notice the deceleration of the vehicle VA feels uncomfortable in the deceleration notification.

When the vehicle VA is automatically decelerated, ECU 20 acquires a target deceleration Gtgt such that the inter-vehicle distance D between the preceding vehicle and the vehicle VA is not equal to or smaller than the set distance Dset. Further, when ECU 20 automatically decelerates the vehicle VA, it acquires the requested braking force Ftgt for the current acceleration Gx to coincide with the target deceleration Gtgt. ECU 20 controls at least the regenerative braking device 40 so that the braking force F generated in the vehicle VA coincides with the requested braking force Ftgt.

The maximum regenerative braking force Fkmax representing the maximum regenerative braking force that can be generated by the regenerative braking device 40 is determined based on, for example, the charge rate of the battery 46. When the requested braking force Ftgt is equal to or less than the maximum regenerative braking force Fkmax, ECU 20 controls the regenerative braking device 40 so that the braking force F coincides with the requested braking force Ftgt. The requested braking force Ftgt may be greater than the maximum regenerative braking force Fkmax. In this case, ECU 20 generates the maximum regenerative braking force Fkmax in the regenerative braking device 40, and the friction braking device 50 generates the "braking force obtained by subtracting the maximum regenerative braking force Fkmax from the requested braking force Ftgt".

When the vehicle VA is decelerated only by the regenerative braking force, the rise of the deceleration is seamless and the change of the deceleration is smooth. Therefore, when the vehicle VA decelerates only by the regenerative braking force, the driver cannot notice the automatic deceleration of the vehicle VA.

When the first condition is satisfied and at least one of the second condition to the fifth condition is satisfied, ECU 20 determines that the suppressing condition is satisfied.

First condition: no friction braking force is generated (i.e., the requested braking force Ftgt is equal to or less than the maximum regenerative braking force Fkmax).

Second condition: The gradient θ of the road surface on which the vehicle VA travels is equal to or greater than the threshold gradient θth. The threshold gradient θth is set to a value larger than "0".

When the vehicle VA climbs an upward gradient, it is difficult for the driver to notice the "automatic deceleration of the vehicle VA".

Third Condition: An evaluation value E indicating a possibility that the driver does not notice the deceleration due to the effect of the vertical oscillation of the vehicle VA is equal to or less than the threshold Eth. This evaluation value E is obtained on the basis of the acceleration Gx and the acceleration Gy. When the evaluation value E is equal to or less than the threshold Eth, it indicates that there is a high possibility that the driver will not notice the deceleration because the effect of the vertical oscillation of the vehicle VA is large. Details of the evaluation value E will be described later.

Fourth condition: The subtraction value ΔAP obtained by subtracting the start operation amount APs from the current acceleration operation amount AP is equal to or greater than the threshold change amount ΔAPth1. The start operation amount APs is the acceleration operation amount AP at the time when the start condition is satisfied.

When the fourth condition is satisfied, it is highly likely that the driver is operating the accelerator pedal 32*a* with the intent of acceleration. When the deceleration notification is performed when the driver has an acceleration intention, the driver is highly likely to feel uncomfortable with the deceleration notification. Further, even when the deceleration control is being performed, when the accelerator pedal 32*a* is operated, a driving force corresponding to the acceleration operation amount AP is applied to the wheels 48, and thus there is a high possibility that the driver will not notice the deceleration of the vehicle VA. Therefore, in the present embodiment, when the fourth condition is satisfied, it is determined that the suppression condition is satisfied.

Fifth condition: The deceleration operation amount BP is equal to or greater than the threshold deceleration operation amount BPth1.

When the fifth condition is satisfied, since the vehicle VA is decelerated by the brake pedal 34*a* of the driver, the driver is hardly aware of the "automatic deceleration of the vehicle VA".

Specific Operation

Figure 2:
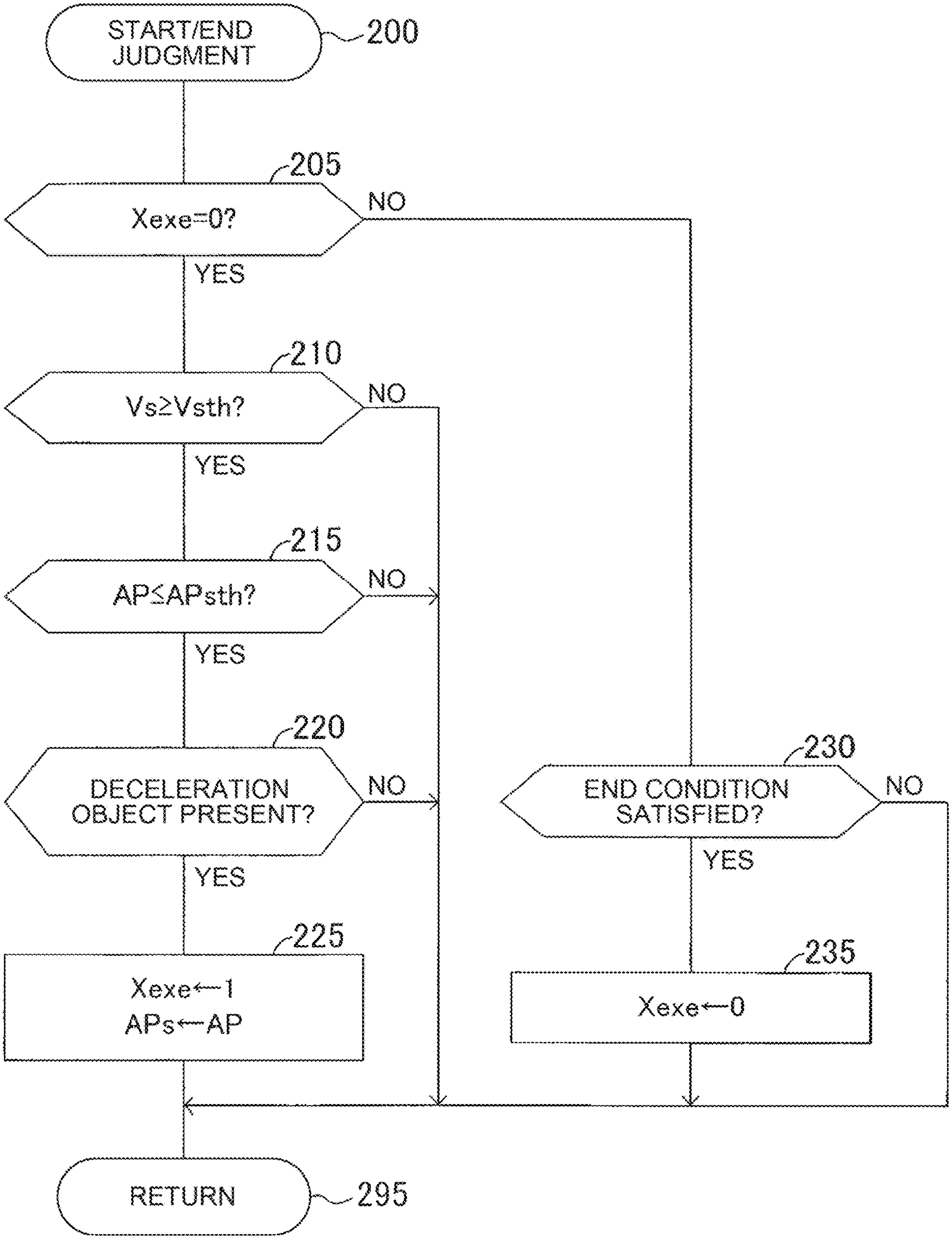
FIG. 2 is a flow chart of a start/end determination routine executed by CPU of ECU shown in FIG. 1.
Figure 3:
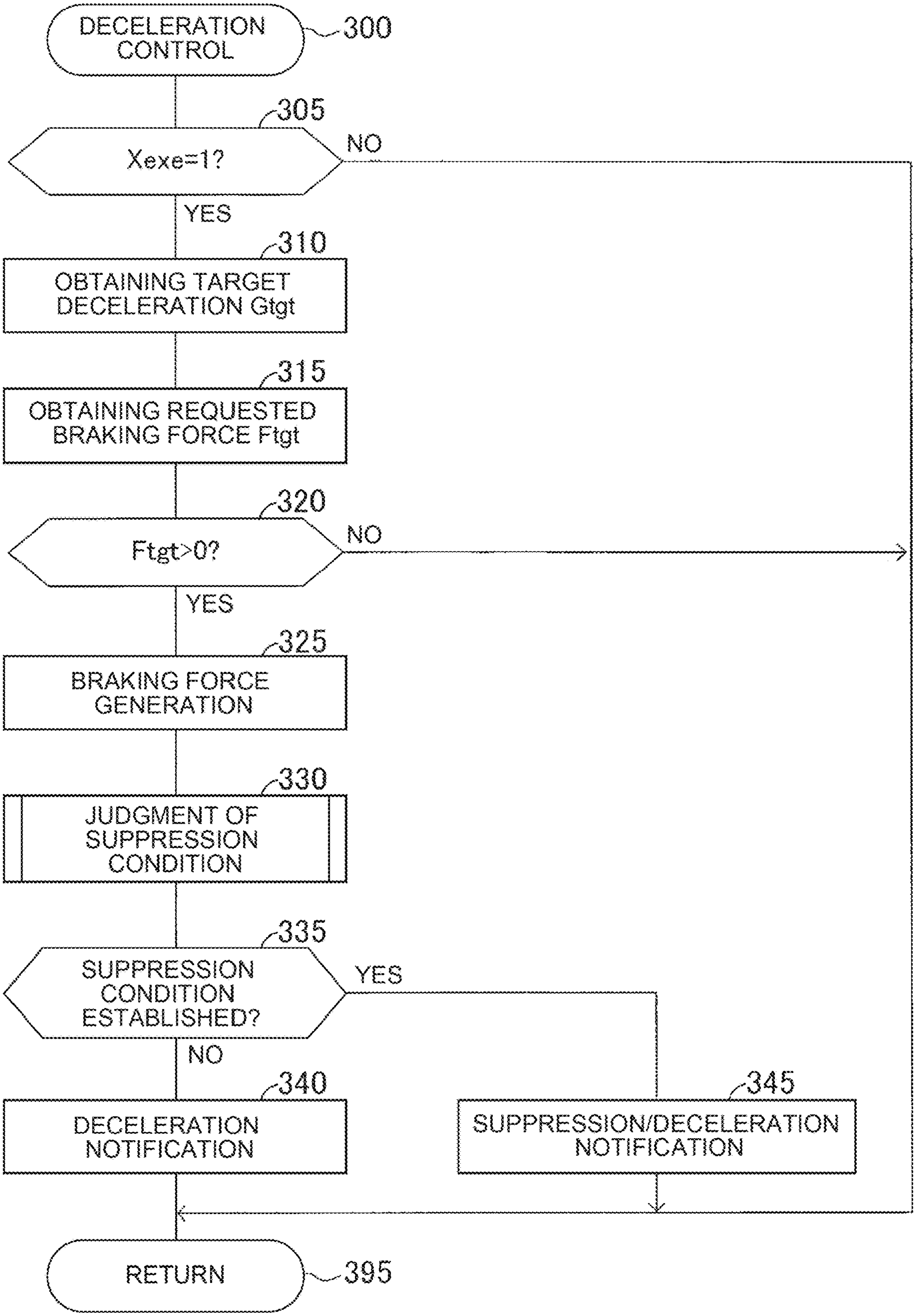
FIG. 3 is a flow chart of a deceleration control routine executed by CPU of ECU shown in FIG. 1.

CPU of ECU 20 is executed every time a predetermined period elapses in the routines illustrated by the flow charts of FIGS. 2 and 3.

Start/End Judgment Routine

Once the appropriate time point has arrived, CPU begins processing at step 200 of FIG. 2 and processing proceeds to step 205. In step 205, CPU determines whether or not the execute flag Xexe is "0".

The execution flag Xexe is set to "1" when the deceleration control is executed and is set to "0" when the deceleration control is not executed. The execute flag Xexe is set to "0" in the initialization routine. CPU executes an initialization routine when an ignition key switch (not shown) of the vehicle VA is changed from an off position to an on position.

If the run flag Xexe is "0", CPU determines "Yes" in step 205, and the process proceeds to step 210. In step 210, CPU determines whether the vehicle speed Vs is greater than or equal to the threshold vehicle speed Vsth.

If the vehicle speed Vs is greater than or equal to the threshold vehicle speed Vsth, CPU determines "Yes" in step 210, and the process proceeds to step 215. In step 215, CPU determines whether the acceleration operation amount AP is less than or equal to the threshold operation amount APsth.

When the acceleration operation amount AP is equal to or smaller than the threshold operation amount APsth, CPU determines "Yes" in step 215, and the process proceeds to step 220. In step 220, CPU determines whether there is a deceleration target in front of the vehicle VA. The deceleration target is an object that causes the need to decelerate the vehicle VA. For example, the deceleration target is a preceding vehicle, a traffic light, a stop line, a curve road, or the like.

When there is a deceleration target, the start condition is satisfied. In this instance, CPU determines "Yes" in step 220, and the process proceeds to step 225. In step 225, CPU sets the execution flag Xexe to "1" and stores the current acceleration operation amount AP as the start operation amount APs. After that, the process proceeds to step 295, and CPU ends the routine once.

When the vehicle speed Vs is less than the threshold vehicle speed Vsth ("No" in step 210), the start condition is not satisfied. When the acceleration operation amount AP is larger than the threshold operation amount APsth ("No" in step 215), the start condition is not satisfied. When there is no deceleration target ("No" in step 220), the start condition is not satisfied. Then, the process proceeds to step 295, and CPU ends the routine once.

If the execution flag Xexe is "1" when the process proceeds to step 205, CPU determines "No" in step 205, and the process proceeds to step 230. In step 230, CPU determines whether the termination condition is satisfied. Specifically, when at least one of the first end condition and the third end condition is satisfied, CPU determines that the end condition is satisfied.

First end condition: The subtraction value ΔAP used in the fourth condition is equal to or larger than the threshold change amount ΔAPth2. The threshold change amount ΔAPth2 is set to a value larger than the threshold change amount ΔAPth1.

When the driver depresses the accelerator pedal 32*a* from the start operation amount APs by the threshold change amount ΔAPth2 or more, the driver has an obvious acceleration intention, and thus the deceleration control is ended.

Second termination condition: The deceleration operation amount BP is equal to or greater than the threshold deceleration operation amount BPth2. The threshold deceleration operation amount BPth2 is set to be larger than the threshold deceleration operation amount BPth1.

When the deceleration operation amount BP is equal to or larger than the threshold deceleration operation amount BPth2, the driver has an obvious deceleration intention, and thus the deceleration control is ended.

Third Termination Condition: Vehicle VA is Stopped.

When the termination condition is satisfied, CPU determines "Yes" in step 230, and the process proceeds to step 235. In step 235, CPU sets the execute flag Xexe to "0". After that, the process proceeds to step 295, and CPU ends the routine once.

If the termination condition is not satisfied, CPU determines "No" in step 230, the process proceeds to step 295, and CPU ends the routine.

Deceleration Control Routine

Once the appropriate time point has arrived, CPU begins processing at step 300 of FIG. 3 and processing proceeds to step 305. In step 305, CPU determines whether or not the execute flag Xexe is "1".

If the execute flag Xexe is "1", CPU determines "Yes" in step 305 and executes steps 310 to 320.

The stepping 310: CPU acquires the target deceleration Gtgt from the relation between the vehicle VA and the deceleration target. The target deceleration Gtgt is a negative acceleration Gx.

For example, when the deceleration target object is a preceding vehicle, CPU acquires a target deceleration Gtgt such that the inter-vehicle distance D does not fall below a preset distance Dset. That is, when the inter-vehicle distance D is equal to or smaller than the set distance Dset, a value larger than "0" is acquired as the target deceleration Gtgt. When the inter-vehicle distance D is longer than the set distance Dset, "O" is acquired as the target deceleration Gtgt (the vehicle VA is not decelerated).

The stepping 315: CPU acquires a requested braking force Ftgt for matching the acceleration Gx of the vehicle VA with the target deceleration Gtgt. When the subtraction value ΔG obtained by subtracting the current acceleration Gx from the target deceleration Gtgt is a negative value, the requested braking force Ftgt becomes larger than "0". The larger the magnitude of the subtraction value ΔG, the larger the requested braking force Ftgt. When the subtraction value ΔG is obtained, the target deceleration Gtgt is used as a negative value.

When the target deceleration Gtgt is "0", the requested braking force Ftgt is "0" because the vehicle VA is not decelerated.

320: CPU of steps determines whether the requested braking force Ftgt is greater than "0".

If the requested braking force Ftgt is greater than "0", CPU determines "Yes" in step 320 and performs steps 325 and 335.

The stepping 325: CPU generates the requested braking force Ftgt.

As described above, when the requested braking force Ftgt is equal to or less than the maximum regenerative braking force Fkmax, CPU causes the regenerative braking device 40 to generate the requested braking force Ftgt. On the other hand, when the requested braking force Ftgt is larger than the maximum regenerative braking force Fkmax, CPU causes the regenerative braking device 40 to generate the maximum regenerative braking force. At the same time, when the requested braking force Ftgt is larger than the maximum regenerative braking force Fkmax, CPU causes the friction braking device 50 to generate a "braking force obtained by subtracting the maximum regenerative braking force Fkmax from the requested braking force Ftgt".

The step 330: CPU executes a suppression condition determination subroutine for determining whether or not the suppression condition is satisfied. Details of the suppression condition determination subroutine will be described later.

The step 335: CPU determines whether or not the suppressing condition is satisfied.

If the suppression condition is not satisfied, CPU determines "No" in step 335, and the process proceeds to step 340. In step 340, CPU displays a deceleration window on the display 60 to provide a deceleration notification. After that, the process proceeds to step 395, and CPU ends the routine once.

When the suppression condition is satisfied, CPU determines "Yes" in step 335, and the process proceeds to step 345. In step 345, CPU is performed by suppressing the reduction notification. In particular, CPU does not present a deceleration window. After that, the process proceeds to step 395, and CPU ends the routine once.

When the execution flag Xexe is "0" ("No" in step 305) and the requested braking force Ftgt is "0" ("No" in step 320), the process proceeds to step 395, and CPU ends the routine once.

Suppression Condition Determination Subroutine

Figure 4:
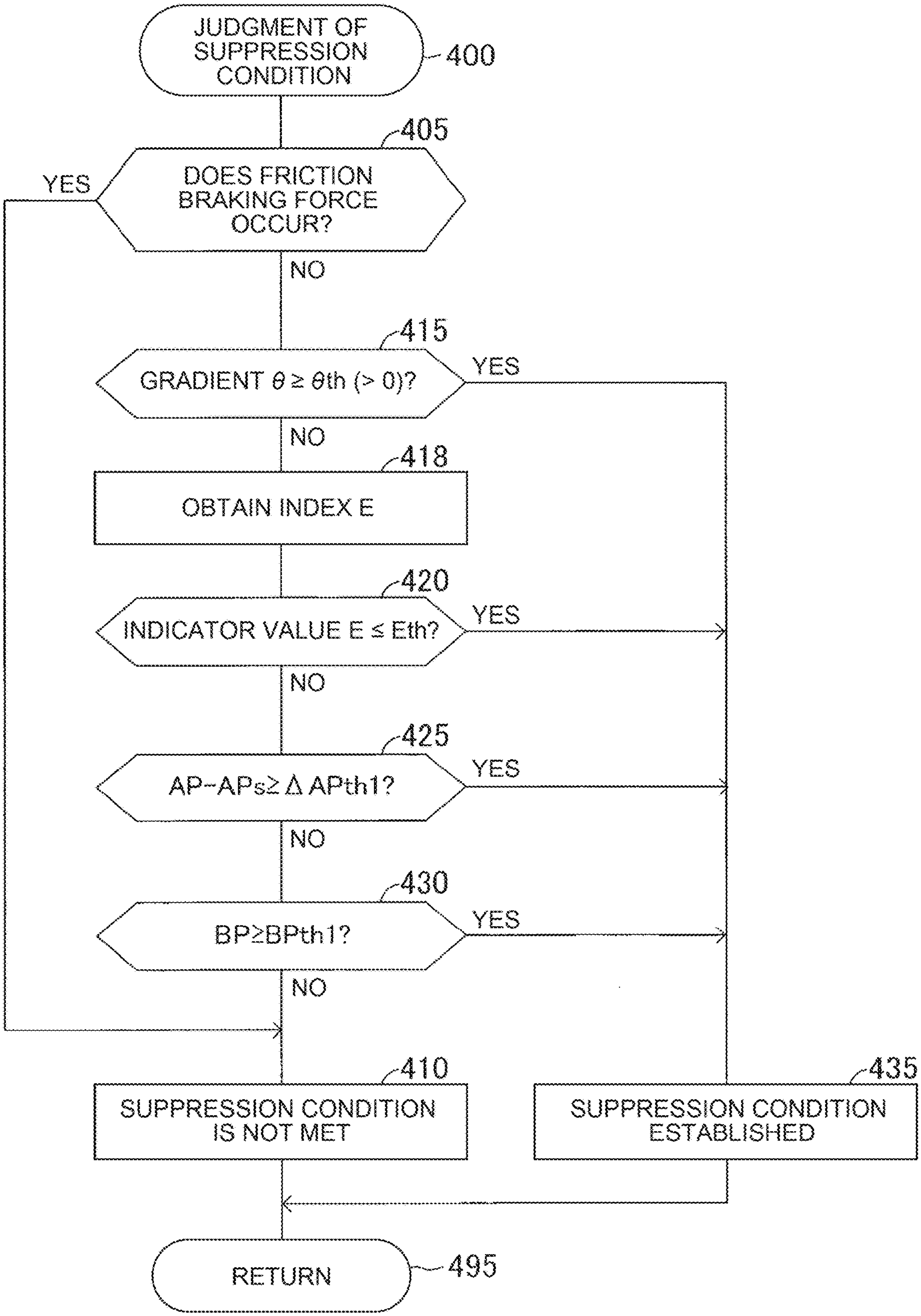
FIG. 4 is a flow chart of a suppression-condition determination subroutine executed by CPU of ECU shown in FIG. 1.

When the process proceeds to step 330, CPU starts the process from step 400 shown in FIG. 4, and the process proceeds to step 405. In step 405, CPU determines whether or not a friction braking force has occurred in step 325 shown in FIG. 3 (i.e., determines whether or not the requested braking force Ftgt is greater than the maximum regenerative braking force Fkmax).

When the friction braking force is generated (when the requested braking force Ftgt is larger than the maximum regenerative braking force Fkmax), CPU determines that the first condition is not satisfied. In this instance, CPU determines "Yes" in step 405 illustrated in FIG. 4, and the process proceeds to step 410. In step 410, CPU determines that the suppression criteria are not satisfied. The process proceeds to step 495, and CPU ends the routine once. Thereafter, processing proceeds to step 335 shown in FIG. 3.

When the friction braking force is not generated (when the requested braking force Ftgt is equal to or less than the maximum regenerative braking force Fkmax), CPU determines that the first condition is satisfied. In this instance, CPU determines "No" in step 405 shown in FIG. 4, and the process proceeds to step 415. In step 415, CPU determines whether the gradient θ is greater than or equal to the threshold gradient θth.

If the gradient θ is less than the threshold gradient θth, CPU determines "No" in step 415 and performs steps 415 and 420.

The step 415: CPU acquires the evaluation value E.

First, CPU performs a weighted filtering process on each of the waveform of the acceleration Gx(t) and the waveform of the acceleration Gy(t) in the evaluation interval Tn (from tn to tn+1) from the "time point earlier by a predetermined period than the current time point" to the current time point, and acquires the acceleration Gxf(t) and the acceleration Gyf(t).

For example, a weighting filter defined in ISO2631-1 is used for the acceleration Gx, and a weighting filter defined in ISO2631-4 is used for the acceleration Gy. In these weighting filters, a weighting coefficient for each frequency component is defined. The weighting coefficient of the frequency component that the occupant feels is poor in riding comfort is set high, and the weighting coefficient of the frequency component that the occupant does not feel poor in riding comfort is set low.

Next, CPU acquires the ride comfort evaluation value Ey (t) in which the vertical ride comfort of the vehicle VA is evaluated using Equation (1).

Math. 1

$$Ey(t) = \frac{1}{t_{n+1} - t_n}\sqrt{\int_{n}^{n+1} Gy(t)^2 dt} \tag{1}$$

Further, CPU acquires the ride comfort evaluation value Exy(t) in which the ride comfort in the front-rear direction and the ride comfort in the up-down direction of the vehicle VA are comprehensively evaluated. First, CPU obtains the magnitude of the combined vector Gxyf(t) of the acceleration Gxf(t) and the acceleration Gyf(t) using Equation (2).

Math. 2

$$Gxy(t) = \sqrt{Gxf(t)^2 + Gyf(t)^2} \tag{2}$$

Then, CPU acquires the ride comfort evaluation value Exy(t) using Equation (3).

Math. 3

$$Exy(t) = \frac{1}{t_{n+1} - t_n}\sqrt{\int_{n}^{n+1} Gxy(t)^2 dt} \tag{3}$$

CPU acquires the ratio (Exy(t)/Ey (t)) of the ride comfort evaluation value Exy(t) to the ride comfort evaluation value Ey (t) as the evaluation value E. The evaluation value E indicates that when the value is larger than "1", the ride comfort is deteriorated due to the acceleration Gx (t) in the front-rear direction. That is, when the evaluation value E is larger than "1", the evaluation value E indicates that the driver is more likely to notice the deceleration.

The step 420: CPU determines whether or not the evaluation value E is equal to or less than the threshold Eth. The threshold Eth is set to be greater than "1". For example, the threshold Eth is set to "1.2". When the evaluation value E is equal to or less than the threshold Eth, it is highly likely that the driver will not notice the deceleration of the vehicle VA because the poor ride comfort due to the deceleration of the vehicle VA is buried in the poor ride comfort due to the vertical oscillation of the vehicle VA.

If the evaluation value E is greater than the threshold Eth, the driver is more likely to notice the deceleration. In this instance, CPU determines "No" in step 420, and the process proceeds to step 425. In step 425, CPU determines whether the subtraction value ΔAP is greater than or equal to the threshold change amount ΔAPth1.

If the subtraction value ΔAP is less than the threshold change amount ΔAPth1, CPU determines "No" in step 425, and the process proceeds to step 430. In step 430, it is determined whether or not the deceleration operation amount BP is equal to or greater than the threshold deceleration operation amount BPth1.

If the deceleration operation amount BP is less than the threshold deceleration operation amount BPth1, CPU determines "No" in step 430, and the process proceeds to step 410. As a consequence, CPU determines that the suppressing condition is not satisfied.

If the gradient θ is greater than or equal to the threshold gradient θth ("Yes" in step 415), the process proceeds to step 435. If the evaluation value E is less than or equal to the threshold Eth ("Yes" in step 420), the process proceeds to step 435. If the subtraction value ΔAP is equal to or greater than the threshold change amount ΔAPth1 ("Yes" in step 425), the process proceeds to step 435. When the deceleration operation amount BP is equal to or larger than the threshold deceleration operation amount BPth1 ("Yes" in step 430), the process proceeds to step 435. In step 435, CPU determines that the suppression criteria are satisfied. The process proceeds to step 495, and CPU ends the routine once. Thereafter, processing proceeds to step 335 shown in FIG. 3.

According to the present embodiment, when the suppression condition is satisfied, the deceleration notification is suppressed as compared with a case where the suppression condition is not satisfied, so that it is possible to reduce the possibility that the driver who does not notice the deceleration of the vehicle VA feels uncomfortable with the deceleration notification.

First Modification

In the above embodiment, when CPU suppresses the deceleration notification, CPU does not show the deceleration window. The reduction of the deceleration notification is not limited to this. For example, when the suppression condition is satisfied, CPU may display "a display element indicating that the vehicle VA has decelerated" and "a display element indicating a reason why the vehicle VA has decelerated" smaller than when the suppression condition is not satisfied. Further, when the suppression condition is satisfied, CPU may display these display elements in lighter colors than when the suppression condition is not satisfied.

Further, when the suppression condition is satisfied, CPU may display the deceleration window later than when the suppression condition is not satisfied.

A modified example of delaying the display of the deceleration screen will be described below.

In this variant, CPU performs steps 310 to 335 shown in FIG. 3 after performing step 225 shown in FIG. 2. That is, it is determined whether or not the suppression condition is satisfied when the start condition is satisfied. If the suppression condition is not satisfied, CPU immediately displays the deceleration screen. On the other hand, when the suppression condition is satisfied, CPU displays a deceleration window when a predetermined period of time has elapsed from the time when it is determined that the suppression condition is satisfied. The deceleration screen is displayed until the end condition is satisfied. In this modification, in the deceleration control routine illustrated in FIG. 3, the determination of the suppression condition and the deceleration notification are not performed.

Furthermore, the deceleration notification is not limited to the display of the deceleration screen. For example, CPU may issue a deceleration notification by outputting an audio message from a speaker (not shown) to notify the driver that the vehicle VA has automatically decelerated.

Second Modification

As the evaluation value E, a vertical ride comfort evaluation value Ey (t) of the vehicle VA may be used. The worse the vertical riding comfort, the more likely the driver is not aware of the deceleration of the vehicle VA. In this modification, when the evaluation value E (i.e., the ride comfort evaluation value Ey (t)) is equal to or larger than the "threshold Eth' set to a value that differs from the threshold Eth", CPU determines that the suppression condition is satisfied.

Therefore, the evaluation value E can be expressed as a value acquired based on at least the ride comfort evaluation value Ey (t). Further, when the relation between the evaluation value E and the threshold satisfies a predetermined condition indicating that it is highly likely that the deceleration of the vehicle VA is not noticed, CPU determines that the suppression condition is satisfied.

Third Modification

The deceleration target is not limited to the preceding vehicle. The deceleration target may be any one of a traffic light, a stop line, and a curve path.

If the deceleration object is either a traffic light or a stop line, CPU obtains a target deceleration Gtgt such that the vehicle VA stops in front of the traffic light or the stop line.

When the deceleration target object is a curve road, CPU acquires a target deceleration Gtgt such that the vehicle speed Vs coincides with the "vehicle speed appropriate for the vehicle VA to travel on the curve road".

Fourth Modification

In the first aspect, it is determined whether the friction braking force is generated based on the requested braking force Ftgt, but the present disclosure is not limited thereto. As described above, since the requested braking force Ftgt is acquired based on the subtraction value ΔG, it may be determined whether or not the friction braking force is generated based on the subtraction value ΔG. Since the requested braking force Ftgt and the subtraction value ΔG are values representing the deceleration in the deceleration control, they may be referred to as deceleration index values. The establishment of the first condition is determined based on the deceleration index, and the establishment of the second condition to the fourth condition is determined based on the traveling condition of the vehicle VA.

The device is applicable to vehicles such as hybrid electric vehicle, plug-in hybrid electric vehicle, fuel cell electric vehicle and battery electric vehicle. Furthermore, the device is also applicable to an autonomous vehicle.

What is claimed is:

1. A drive assist device configured to perform deceleration notification for notifying a driver that a vehicle is decelerated when the vehicle is automatically decelerated, wherein the drive assist device is configured to:

determine whether a suppression condition is satisfied based on a deceleration index value indicating a degree of deceleration of the vehicle and a traveling state of the vehicle, satisfaction of the suppression condition indicating a higher possibility that the driver is not aware of the deceleration of the vehicle than in a case where the suppression condition is not satisfied; and when the suppression condition is satisfied, suppress the deceleration notification as compared with the case where the suppression condition is not satisfied.

2. The drive assist device according to claim 1, wherein:

the drive assist device includes:

a friction braking device configured to generate a friction braking force on a wheel of the vehicle; and a regenerative braking device configured to generate a regenerative braking force on the wheel;

the drive assist device is configured to:

acquire a requested braking force to be used as the deceleration index value when automatically decelerating the vehicle, and generate the requested braking force in the regenerative braking device when the requested braking force is equal to or less than a maximum regenerative braking force that is the regenerative braking force to be generated at a maximum by the regenerative braking device;

when the requested braking force is larger than the maximum regenerative braking force, generate the maximum regenerative braking force in the regenerative braking device and generate the friction braking force in the friction braking device at a value obtained by subtracting the maximum regenerative braking force from the requested braking force; and determine whether the friction braking force is not generated based on the requested braking force; and the suppression condition includes at least a condition that the friction braking force is not generated.

3. The drive assist device according to claim 1, wherein the drive assist device is configured to determine that the suppression condition is satisfied in response to satisfaction of at least one of conditions that:

a gradient of a road surface where the vehicle is traveling is an upward gradient for the vehicle and a magnitude of the gradient is equal to or larger than a threshold gradient; and a relationship between a threshold and an evaluation value acquired based on a ride comfort evaluation value indicating ride comfort in a vertical direction that is acquired based on an acceleration of the vehicle in the vertical direction satisfies a predetermined condition.

4. The drive assist device according to claim 3, wherein the drive assist device is configured to:

when a predetermined start condition is satisfied, start deceleration control for automatically decelerating the vehicle in response to a need to decelerate the vehicle; and determine that the suppression condition is satisfied in response to satisfaction of at least one of conditions that:

an operation amount of an acceleration operation element of the vehicle increases by a threshold change amount or larger as compared with the operation amount when the start condition is satisfied; and an operation amount of a deceleration operation element of the vehicle is equal to or larger than a threshold operation amount.

* * * * *